United States Patent [19]
Keller et al.

[11] 3,859,351

[45] Jan. 7, 1975

[54] PREPARATION OF LOW MOLECULAR WEIGHT ETHERIFIED METHYLOL UREAS AND THIOUREAS

[75] Inventors: Karlfried Keller, Bergen-Enkheim; Karl Schnee, Dornigheim; Dieter Tichy, Frankfurt am (Main)-Fechenheim, all of Germany

[73] Assignee: Cassella Farbwerke Mainkur Aktiengesellschaft, Frankfurt am (Main)-Fechenheim, Germany

[22] Filed: July 3, 1972

[21] Appl. No.: 268,810

[30] Foreign Application Priority Data
July 7, 1971   Germany............................ 2133820

[52] U.S. Cl.......... 260/552 R, 260/553 R, 156/331, 117/155 L, 117/139.5 A, 117/148
[51] Int. Cl.......................................... C07c 127/12
[58] Field of Search........ 260/553 R, 552 R, 29.4 R

[56] References Cited
UNITED STATES PATENTS

| | | | |
|---|---|---|---|
| 1,963,762 | 6/1934 | Pungs et al...................... | 260/553 R |
| 2,315,745 | 4/1943 | Sorenson......................... | 260/553 R |
| 2,825,710 | 3/1958 | Etzel............................... | 260/29.4 R |
| 2,859,206 | 11/1958 | Polansky et al................ | 260/29.4 R |

Primary Examiner—Leon Zitver
Assistant Examiner—Michael W. Glynn
Attorney, Agent, or Firm—Connolly and Hutz

[57] ABSTRACT

Urea or thiourea is reacted with an aqueous formaldehyde solution in a molar ratio of urea or thiourea to formaldehyde of 1:0.8 to 1:1.4 in the presence of 1 to 8 mol, per mol of urea or thiourea, of a water-miscible monohydric or polyhydric alcohol under alkaline conditions until a sample no longer shows turbidity after cooling to 0° C. and the utility thereof for the same purposes that aminoplast resins are employed.

4 Claims, No Drawings

PREPARATION OF LOW MOLECULAR WEIGHT ETHERIFIED METHYLOL UREAS AND THIOUREAS

It is known that one may condense urea with at least 1.5 mol of formaldehyde in an aqueous solution in the presence of alcohols to obtain partially etherified urea formaldehyde resins, the reaction taking place at least partially in an acid solution. When lower molar ratios of reactants are used in this process, only insoluble products essentially containing polymethylene urea result. It is furthermore known that monomethylol urea may be prepared with certain precautions in a weakly alkaline solution. However, these solutions are not stable. Instead and even at low temperatures, they polycondense rapidly with the precipitation of polymethylene urea.

It has now been found that low molecular weight methylol ureas and methylol thioureas which are especially stable in aqueous solution may be prepared if urea or thiourea is reacted with an aqueous formaldehyde solution in a molar ratio of urea or thiourea to formaldehyde of 1:0.8 to 1:1.4 in the presence of 1 to 8 mol, per mol of urea or thiourea, of watermiscible monohydric or polyhydric alcohol at a temperature of below about 150° C. under alkaline reaction conditions until a sample of the reaction mixture no longer exhibits turbidity upon cooling to 0° C. When selecting the alkaline reaction conditions, the pH-values are normally adjusted to somewhat above 7, for example 7.5, to 12.

The novel reaction of the present invention yields compounds which contain no more than four urea or thiourea molecules joined together and practically no free methylol groups. Instead, the compounds produced by this reaction contain combined formaldehyde in the form of methylene and alkoxymethyl moieties.

It was unexpected to ascertain that the process of the present invention may be carried out in a constantly reproducible manner after the initial formation of methylol urea or methylolthiourea, which may be readily recognized by crystallization on cooling. However, on further heating of the alkaline solutions of the etherified methylol ureas or thioureas of the present invention, turbidities again occur after some time and, unlike the turbidities occurring prior to the completion of the process of the present invention, these turbidities can no longer be eliminated by further heating. The latter turbidities relate to the polymethylene urea or polymethylene thiourea which, even with acidifying and subsequent heating, form particularly rapidly. However, it is possible to prepare stable, acid, strongly cation-active solutions by the addition of greater than catalytic amounts of strong acids to the solutions of the etherified methylol ureas or thioureas prepared in accordance with the process of the present invention.

In accordance with the low molecular weight nature of the products prepared by the process of the present invention, their aqueous solutions display very low viscosities. This is true even after evaporation, under normal pressure or vacuum, to obtain a high solids content, i.e., even 75% solutions, for example, are still useful for the saturation of paper tapes. If all volatile constituents are distilled off, there remains a viscous colorless oil which, upon analysis, consists of mixtures of various low molecular weight, etherified methylene ureas or thioureas which have no tendency to crystallize.

Hardening of the methylol urea or thiourea ethers may be accomplished with heat and if it is desired to accelerate hardening, acid hardeners may also be added. The weight loss occurring on hardening corresponds to the calculated loss which results when one assumes the splitting off of the alkoxyl groups in the form of an alcohol.

All water-miscible monohydric and polyhydric alcohols are useful in the process of the present invention. Particularly preferred alcohols include those which are miscible in all proportions with water. Typical and preferred alcohols include alkanols having one to three carbon atoms (methanol, ethanol, n-propanol, i-propanol), alkandiols having one to three carbon atoms (ethylene glycol, propylene glycol, trimethylene glycol) and glycerol. Of these, methyl alcohol or a mixed alcohol having a preponderant amount of methyl alcohol is particularly useful.

Preferably, at least 37% aqueous formaldehyde is employed in the process of the present invention. Although more dilute formaldehyde may be employed, it requires the use of larger amounts of alcohol for the production of the etherified methylol ureas or thioureas.

The molar ratios of urea or thiourea to formaldehyde preferably employed is 1:0.8 to 1:1.0. At this ratio, practically no branched chains are formed. If the molar ratio is below 1:0.8, the danger exists that with an insufficient reaction time, the unreated urea of thiourea will crystallize out of the reaction mixture.

The preferred reaction temperatures of the present invention range from about room temperature up to about 150° C. and the choice thereof depends on the desired reaction time. The process may be carried out under pressure or under vacuum. A preferred manner of operation involves operation at reflux temperature. Reaction times generally range from several minutes up to 48 hours; the reaction is completed when a sample of the reaction mixture no longer displays turbidity when cooled to 0° C. Accordingly, it is a relatively easy matter to ascertain, by pretesting, the necessary reaction time at the selected temperature.

The etherified products of the present invention are stable at room temperature as a rule for more than ½ year and this is independent of whether excess alcohol remains in the product or is removed by evaporation and concentration of the aqueous solutions.

The etherified products prepared by the process of the present invention are basically suitable for all purposes for which aminoplast resins have been used and often offer particular advantages because of their excellent stability, low viscosity and high waterproofness after condensing to form the essentially linear water-insoluble polymethylene urea or thiourea. Even the addition of the products of the present invention to known aminoplast resins often offers advantages, particularly with respect to elasticity.

Among the plurality of utilities of the products of the process of the present invention may be mentioned saturating paper tapes for forming laminated products, the preparation of lacquers and coatings, improving the wet strength of paper, improving waterproofness of surface coatings for paper, modification of polymeric resins, use for the finishing of textiles and for the tanning of leather, binding agents and adhesives for molding preparations and wood chip boards, as well as the preparation of foam materials.

The following examples are for the purpose of illustrating the present invention.

EXAMPLE 1

Urea (60 parts by weight) is mixed with 77 parts by weight 39% aqueous formaldehyde, 64 parts by weight methanol (molar ratio 1:1:2) and 0.24 parts by weight of potassium carbonate and this mixture having a pH of 10 is boiled at reflux for 18 hours until a sample, cooled to 0° C., no longer shows turbidity. After cooling, the approximately 43% clear solution, which is dilutable with water to any extent desired, of low molecular weight, etherified methylol urea is ready for use. If higher contents are desired or if the presence of unreacted methanol is undesirable, concentration may be accomplished at normal pressure or, preferably, under reduced pressure. The viscosity of a 75% solution amounts to 20–24 GIS (German Industrial Standards)-seconds in the 4 mm. beaker. Analysis of the dry residue confirms the presence of a methoxymethyl-methylenebisurea.

The amount of methanol used in the preceding paragraph may be increased. However, this extends the reaction time. The reaction product may be used, for example, for the impregnation of laminates for molded laminated plastics with the addition of acid hardeners or as elasticizing agents in melamine resins.

If in the first paragraph of this example, the methanol is replaced by 92 parts by weight ethanol, practically the same result is achieved. This holds true also for the use of 144 parts by weight of glycol in place of the methanol. However, the reaction time is considerably shorter because of the higher reflux temperature.

EXAMPLE 2

Thiourea (76 parts by weight) is mixed with 77 parts by weight 39% aqueous formaldehyde, 64 parts by weight methanol (molar ratio 1:1:2) and 0.24 parts by weight potassium carbonate and this mixture is boiled at reflux for 6 hours. A sample drawn from the resulting reaction mixture remains clear after cooling to 0° C. and has a water dilutability of 1:1.5. The thusly prepared reaction product may be used without isolation of the low molecular weight etherified methylol thiourea for, as an example, the preparation of laminated molding preparations which are to be used under particularly low pressures.

We claim:

1. A process for preparing low molecular weight etherified methylol ureas or methylol thioureas of high stability in aqueous solution, said process comprising reacting urea or thiourea with an aqueous formaldehyde solution in a molar ratio of urea or thiourea to formaldehyde of 1:0.8 to 1:1.4 in the presence of 1 to 8 mol, per mol of urea of thiourea, of methanol or ethanol at a temperature below about 150° C. and at a pH of from 7.5 to 12 obtained by the addition of potassium carbonate until a sample of the reaction mixture no longer displays turbidity when cooled to 0° C.

2. The process of claim 1 wherein the reaction is carried out under reflux conditions.

3. The process of claim 1 wherein from 0.8 to 1.0 mol of formaldehyde is employed per mol of urea or thiourea.

4. The process of claim 1 wherein said aqueous formaldehyde solution contains at least 37% aqueous formaldehyde.

* * * * *